(12) United States Patent
Ryan

(10) Patent No.: US 10,799,073 B1
(45) Date of Patent: Oct. 13, 2020

(54) FAUCET MOUNTABLE TOILETRY HOLDING ASSEMBLY

(71) Applicant: Jonathan Ryan, Bartlett, TN (US)

(72) Inventor: Jonathan Ryan, Bartlett, TN (US)

( * ) Notice: Subject to any disclaimer, the term of this patent is extended or adjusted under 35 U.S.C. 154(b) by 0 days.

(21) Appl. No.: 16/545,661

(22) Filed: Aug. 20, 2019

(51) Int. Cl.
| | |
|---|---|
| *A47K 1/09* | (2006.01) |
| *A45D 27/29* | (2006.01) |
| *A47K 3/28* | (2006.01) |
| *A47B 43/00* | (2006.01) |
| *A47J 47/20* | (2019.01) |

(52) U.S. Cl.
CPC .............. *A47K 1/09* (2013.01); *A45D 27/29* (2013.01); *A47B 43/00* (2013.01); *A47K 3/281* (2013.01); *A47J 47/20* (2013.01)

(58) Field of Classification Search
CPC . A47K 1/09; A47K 10/08; A47K 1/02; A47K 3/281; A47K 10/04; A47K 7/00; A45D 27/29; A47J 47/20; A47J 47/16; A47G 25/14; A47G 29/08; A47G 25/0685; A47G 25/0607; D06F 57/12; D06F 57/04; A47F 5/00; A47F 7/0021; A47F 5/0006; A47F 5/10; A47F 5/04; F16B 2/22; F16B 2/20; A47B 81/02; A47B 43/00; A47B 45/00; A47L 13/512; A47L 13/51; A46B 17/02; B44D 3/123; E03C 1/06; E03C 1/04
USPC ............ 211/65, 119.011, 119.009, 123, 124, 211/105.1–105.6, 99, 100, 196, 118, 172, 211/171, 66, 193, 175, 195, 197, 104, 211/112, 107; 248/89, 92, 93, 67.7, 212, 248/213, 215, 214, 230.5, 231.81, 231.71, 248/316.1, 316.6, 316.7, 309.1, 230.6, 248/230.7; 4/569, 570, 601, 615
See application file for complete search history.

(56) References Cited

U.S. PATENT DOCUMENTS

| | | | | | |
|---|---|---|---|---|---|
| 898,263 | A | * | 9/1908 | Rice | A47G 1/16 248/474 |
| 1,073,763 | A | * | 9/1913 | Kalitzky | A47G 25/0664 211/196 |
| 1,274,172 | A | * | 7/1918 | Lee | A47F 5/01 211/106 |
| 1,387,363 | A | * | 8/1921 | De Fore | A47K 1/09 248/212 |
| 1,431,611 | A | * | 10/1922 | Williams | A47K 10/08 211/119.011 |
| 1,447,741 | A | * | 3/1923 | Vandeventer | A47G 25/403 211/104 |
| 1,602,957 | A | * | 10/1926 | Weigel | A45D 29/18 132/314 |
| 1,655,799 | A | * | 1/1928 | Rickersberg | A47K 1/08 248/212 |

(Continued)

*Primary Examiner* — Jennifer E. Novosad

(57) ABSTRACT

A faucet mountable toiletry holding assembly includes a mount that has an opening extending therethrough for receiving a faucet. A securing member is engaged with the mount and is configured to tighten the mount on the faucet. A first arm is attached to and extends laterally outwardly from the mount. The first arm has an outer end. A plurality of containers is attached to the outer end of the first arm. Each of the containers has an open top end. A second arm is attached to and extends laterally away from the mount in an opposite direction relative to the first arm. The second arm has a distal end relative to the mount. A vessel is attached to the distal end of the arm and has an open upper end.

8 Claims, 7 Drawing Sheets

(56) References Cited

U.S. PATENT DOCUMENTS

| | | | | |
|---|---|---|---|---|
| 1,867,525 A * | 7/1932 | Piersall | A47J 47/20 | 248/212 |
| 1,957,353 A * | 5/1934 | Piersall | A47J 47/20 | 248/212 |
| 2,156,025 A * | 4/1939 | Paul | A24F 19/0092 | 248/230.4 |
| 2,168,689 A | 8/1939 | Smith | | |
| 2,295,972 A * | 9/1942 | Simmonds | A47K 5/02 | 248/212 |
| 2,357,774 A * | 9/1944 | Stewart | A47K 5/05 | 248/212 |
| 2,446,142 A * | 7/1948 | Root | F16K 27/00 | 248/212 |
| 2,604,214 A * | 7/1952 | Fussell | A47F 7/24 | 211/207 |
| 2,642,194 A * | 6/1953 | Boltauzer | A47G 25/746 | 211/104 |
| 2,654,484 A * | 10/1953 | Win | A47G 25/0671 | 211/1.3 |
| 2,979,211 A * | 4/1961 | Fritzel | A47K 1/08 | 211/119.009 |
| 3,023,912 A * | 3/1962 | Sebastian | A47G 25/0664 | 211/196 |
| 3,024,564 A * | 3/1962 | Schmidt | A47K 3/281 | 211/74 |
| 3,076,557 A * | 2/1963 | Husted | A45F 3/44 | 211/196 |
| 3,194,526 A * | 7/1965 | Lemmond | A47K 5/02 | 248/231.81 |
| 3,266,764 A * | 8/1966 | Briles | A47K 3/281 | 248/213 |
| 3,318,458 A * | 5/1967 | Sidney | B01L 9/52 | 211/113 |
| 3,329,381 A * | 7/1967 | Moore | B65H 75/36 | 248/89 |
| 3,338,540 A * | 8/1967 | Barish | A47K 5/05 | 248/212 |
| 3,429,546 A * | 2/1969 | Porter | G09F 15/0087 | 248/486 |
| 3,982,284 A * | 9/1976 | Becker | A47K 4/00 | 4/615 |
| D243,488 S * | 3/1977 | Linse | D8/356 | |
| 4,029,211 A * | 6/1977 | Marshall | A47B 61/02 | 211/104 |
| D245,134 S * | 7/1977 | Friedberg | D6/324 | |
| 4,108,314 A * | 8/1978 | Racca | A47K 3/281 | 211/113 |
| D278,106 S * | 3/1985 | Green | D6/315 | |
| 4,542,828 A | 9/1985 | Gotto | | |
| 4,765,584 A * | 8/1988 | Lazaris | B25H 3/04 | 211/70.1 |
| D313,672 S | 1/1991 | Tiegs | | |
| 5,423,427 A | 6/1995 | Brown | | |
| 5,564,566 A * | 10/1996 | Lamb | B25H 3/00 | 206/349 |
| 6,062,397 A | 5/2000 | Licari | | |
| 6,243,967 B1 * | 6/2001 | Dovolas | F26B 25/18 | 211/13.1 |
| 6,719,254 B1 * | 4/2004 | Speiser | A47K 1/09 | 248/311.2 |
| 7,207,450 B1 * | 4/2007 | Franklin | A45F 3/44 | 108/25 |
| 7,240,816 B2 * | 7/2007 | Tsai | B60R 9/06 | 211/195 |
| 7,770,742 B1 * | 8/2010 | Wagner | A47K 3/281 | 211/113 |
| 8,047,492 B2 * | 11/2011 | Wang | B62H 3/12 | 211/106.01 |
| D670,025 S * | 10/2012 | Touzjian | D27/194 | |
| 8,573,416 B2 * | 11/2013 | Didehvar | A47B 45/00 | 211/119.009 |
| 8,596,473 B2 * | 12/2013 | Newbould | A47B 96/067 | 211/88.01 |
| 8,684,192 B1 * | 4/2014 | Margolin | A47J 47/20 | 211/41.3 |
| 9,226,571 B1 * | 1/2016 | Belitz | A61C 19/002 | |
| 9,308,974 B1 * | 4/2016 | Randall | D06F 57/12 | |
| 9,402,451 B2 | 8/2016 | Sterns | | |
| 9,963,183 B2 * | 5/2018 | Karl | B62J 11/00 | |
| 10,292,541 B2 * | 5/2019 | Kublin | A47K 10/08 | |
| 2006/0261022 A1 * | 11/2006 | Sampaio | A47K 3/281 | 211/119.009 |
| 2006/0289372 A1 * | 12/2006 | Yang | A47L 19/02 | 211/41.3 |
| 2008/0142542 A1 * | 6/2008 | Petry | A47K 10/38 | 221/283 |
| 2009/0078591 A1 * | 3/2009 | Hofman | A45C 11/008 | 206/77.1 |
| 2016/0088967 A1 * | 3/2016 | Moli | F16B 47/00 | 211/86.01 |

\* cited by examiner

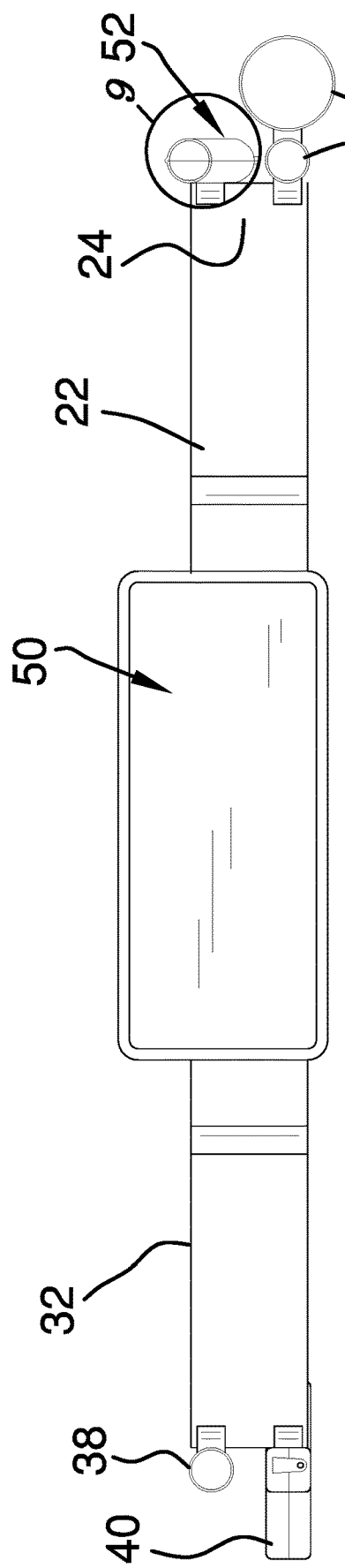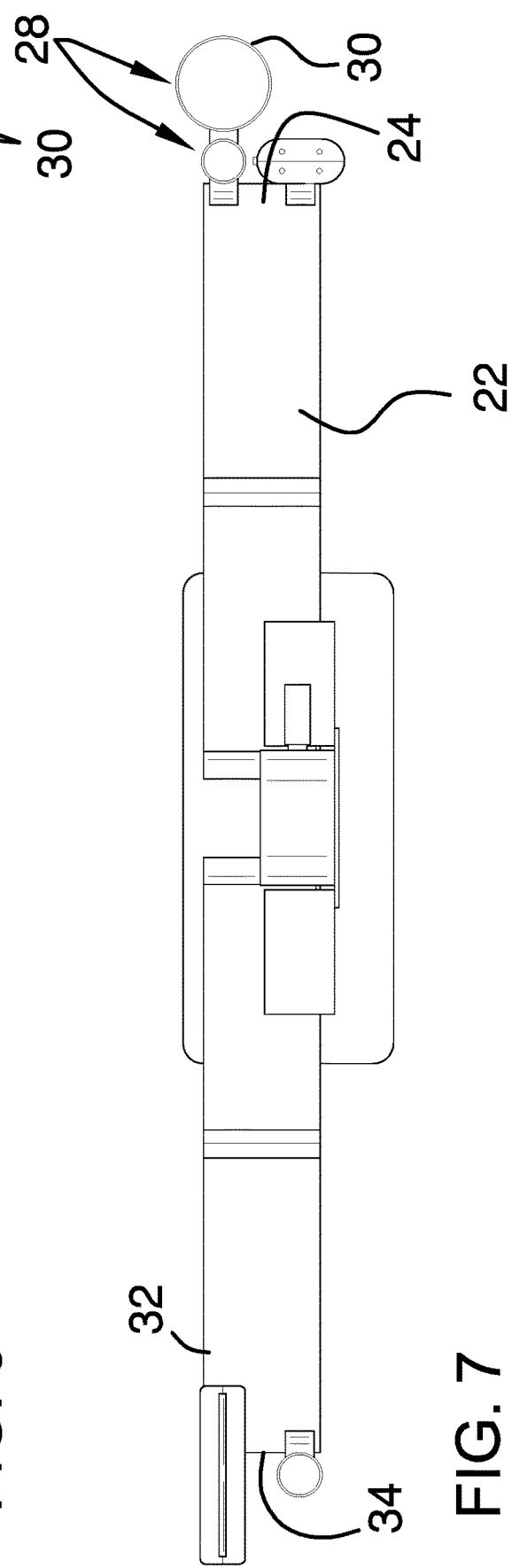
FIG. 6
FIG. 7

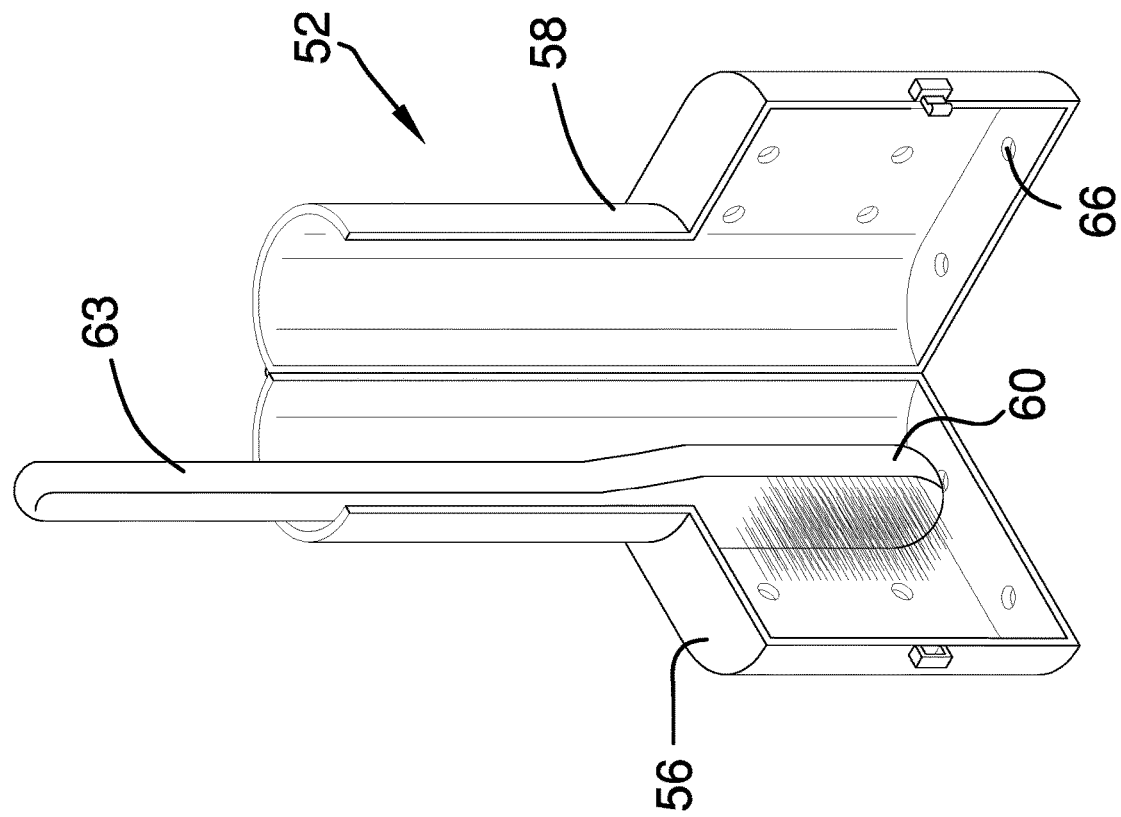
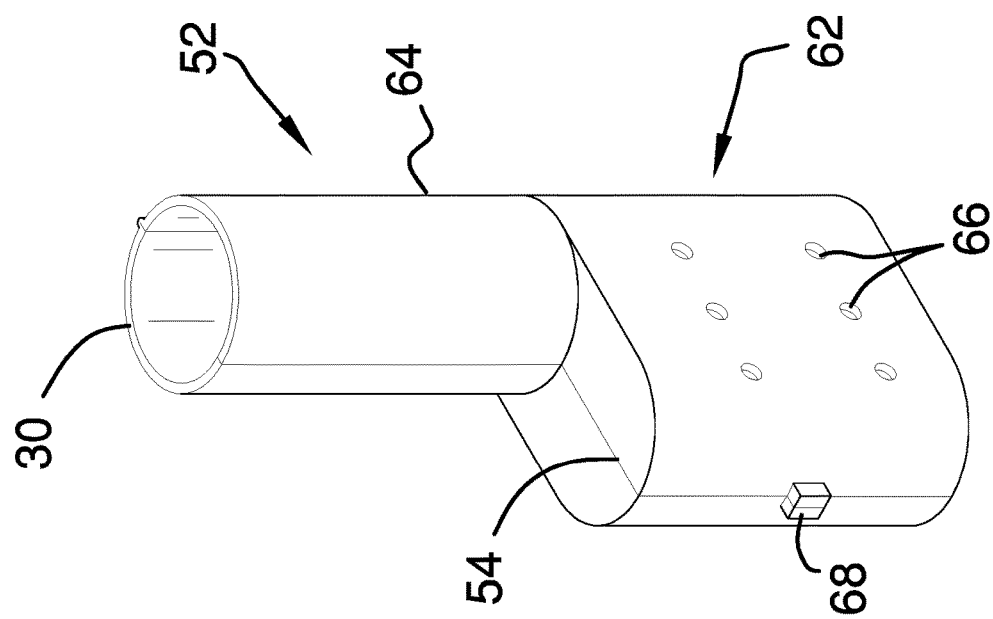

FAUCET MOUNTABLE TOILETRY HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to mountable container devices and more particularly pertains to a new mountable container device for holding a plurality of articles required while performing personal grooming tasks and positioning these articles adjacent to a sink.

BRIEF SUMMARY OF THE INVENTION

An embodiment of the disclosure meets the needs presented above by generally comprising a mount that has an opening extending therethrough for receiving a faucet. A securing member is engaged with the mount and is configured to tighten the mount on the faucet. A first arm is attached to and extends laterally outwardly from the mount. The first arm has an outer end. A plurality of containers is attached to the outer end of the first arm. Each of the containers has an open top end. A second arm is attached to and extends laterally away from the mount in an opposite direction relative to the first arm. The second arm has a distal end relative to the mount. A vessel is attached to the distal end of the arm and has an open upper end.

There has thus been outlined, rather broadly, the more important features of the disclosure in order that the detailed description thereof that follows may be better understood, and in order that the present contribution to the art may be better appreciated.

There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a top view of an embodiment of the disclosure.

FIG. 7 is a bottom view of an embodiment of the disclosure.

FIG. 9a is an enlarged isometric view of area "9" of FIG. 6 of an embodiment of a toothbrush holder of the disclosure.

FIG. 9b is an enlarged isometric view of an embodiment of a toothbrush holder of the disclosure in an open condition.

DETAILED DESCRIPTION OF THE INVENTION

Figure 1:
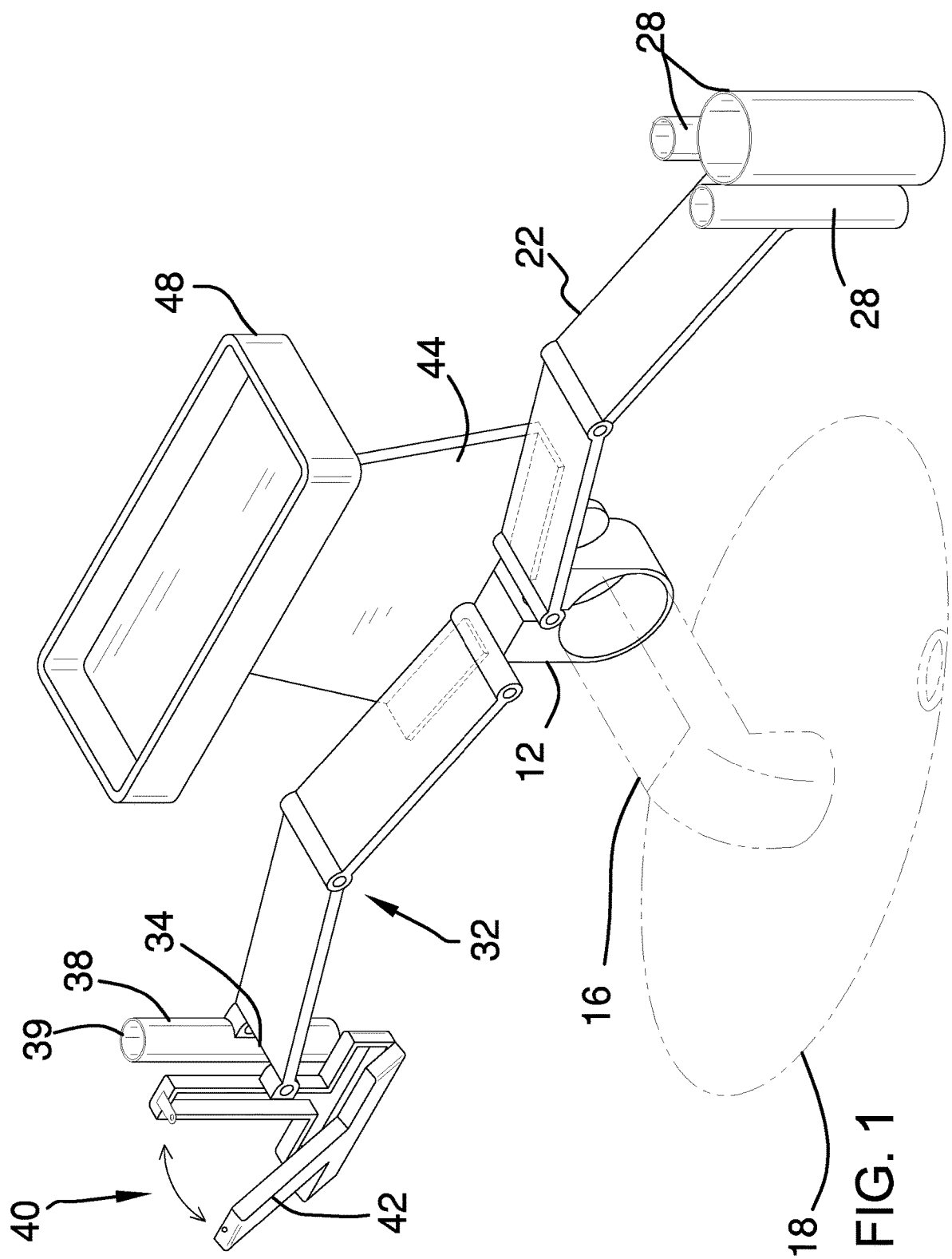
FIG. 1 is a front isometric view of a faucet mountable toiletry holding assembly according to an embodiment of the disclosure.
Figure 2:
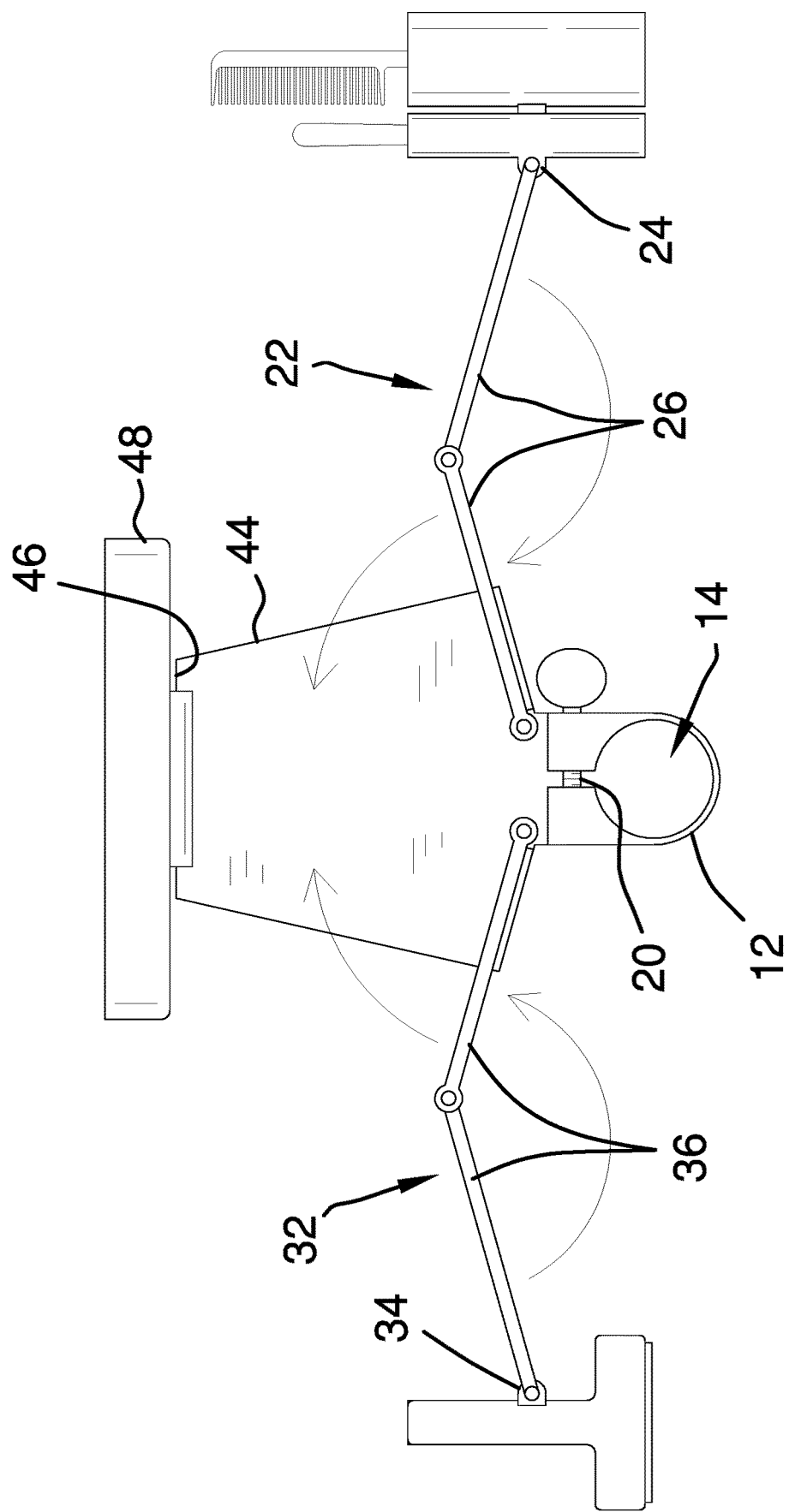
FIG. 2 is a front view of an embodiment of the disclosure.
Figure 3:
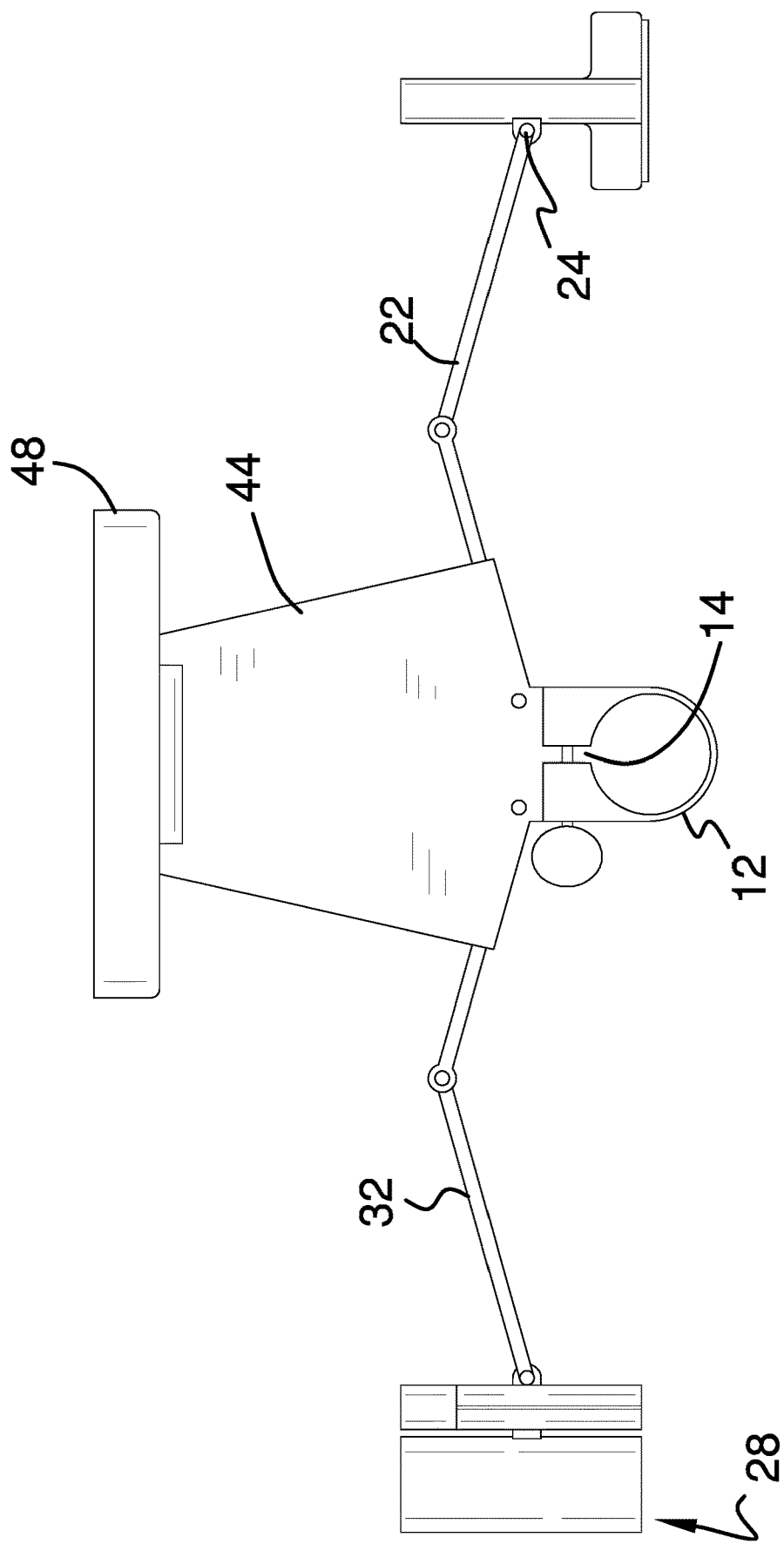
FIG. 3 is a rear view of an embodiment of the disclosure.

With reference now to the drawings, and in particular to FIGS. 1 through 8 thereof, a new mountable container device embodying the principles and concepts of an embodiment of the disclosure and generally designated by the reference numeral 10 will be described.

As best illustrated in FIGS. 1 through 8, the faucet mountable toiletry holding assembly 10 generally comprises a mount 12 that has an opening 14 extending therethrough for receiving a faucet 16, such as the type that extends over a bathroom sink 18. A securing member 20 is engaged with the mount 12 and is configured to tighten the mount 12 on the faucet 16. The securing member 20 may include a threaded rod that is tightened to tighten the mount 14 which may be a sleeve for receiving the faucet 16.

A first arm 22 is attached to and extends laterally outwardly from the mount 12. The first arm 22 has an outer end 24. The first arm 22 has a break therein and includes a pair of sections 26 hingedly coupled to each other such that the first arm 22 may be deployed or collapsed relative to the mount. The pair of sections 26 are attached together in such a way that the sections 26 are stiff relative to each other and therefore more than 2.0 lbs. of pressure are required to move the sections 26 relative to each other. Alternatively, the connection between the sections 26 may be one that can be tightened or loosened as desired.

A plurality of containers 28 is attached to the outer end 24 of the first arm 22. Each of the containers 28 has an open top end 30. At least one of the containers 28 may have a cylindrical shape and at least one of the containers 28 may have an oblong shape. The containers 28 may include at three containers of various sizes and shapes so that may hold a variety of different items including razors, shaving cream, face wash, hair brush, tooth paste and the like. The containers 28 may be attached together as group or individually attached to the first arm 22. The containers 28 are hingedly coupled to the first arm 22 so that the angle of containers 28 may be altered as needed relative to the first arm 22.

One of the containers 28 may specifically comprise a toothbrush holder 52 which is best shown FIGS. 9a and 9b. The toothbrush holder 52 includes an open top end 30 but has a dividing line 54 dividing the toothbrush holder 52 into a first section 56 and a second section 58 pivotally coupled together, such as with a living hinge or conventional hinge, to allow the toothbrush holder 52 to be opened and a toothbrush head 60 placed in an enlarged lower section 62 while the toothbrush handle 63 extends upwardly from a narrow, possibly cylindrical, upper section 64. The toothbrush holder 52 further includes a plurality of apertures 66 for allowing the toothbrush head 60 to dry after use. As is readily apparently, by the enlarged lower section protects the toothbrush head 60 from germs by contact with other articles while the apertures facilitate the drying out of the toothbrush head 60. A locking tab 68 allows the toothbrush holder 52 to be releasably secured in a closed condition.

A second arm 32 is attached to and extends laterally away from the mount 12 in an opposite direction relative to the first arm 22. The second arm 32 has a distal end 34 relative to the mount 12. The second arm 32 has a break therein and includes a pair of portions 36 hingedly coupled to each other such that the second arm 32 may be deployed or collapsed relative to the mount 12. The portions 36 are secured together in the same manner as the sections 26 of the first arm 22 to require some force to move the portions 36 relative to each other. A vessel 38 is attached to the distal end 34 of the second arm 32 and has an open upper end 39. The vessel 38 may have a cylindrical shape and be used for holding additional toothbrushes or other, narrow items including cotton swabs. A case 40 having a closable lid 42 is attached to the distal end 34 of the second arm 32 and may be used, for example, to secure a safety razor to the second arm 32. The case 40 and vessel 38 are hingedly coupled to the second arm 32 to allow their being angled relative to the second arm 32.

Figure 5:
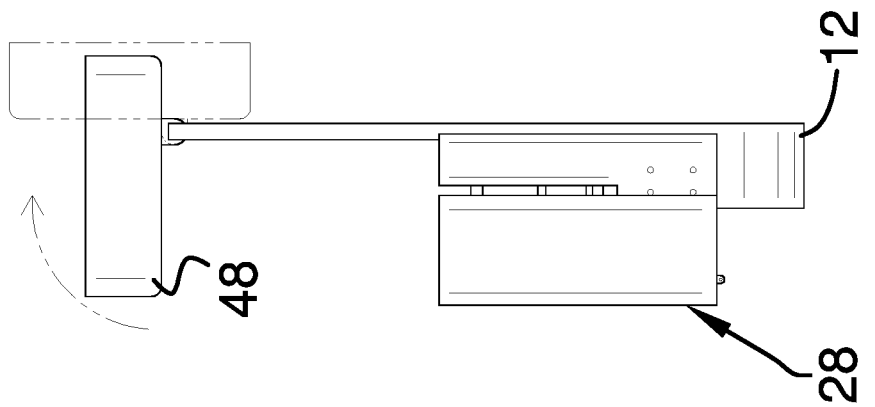
FIG. 5 is a right view of an embodiment of the disclosure.
Figure 4:
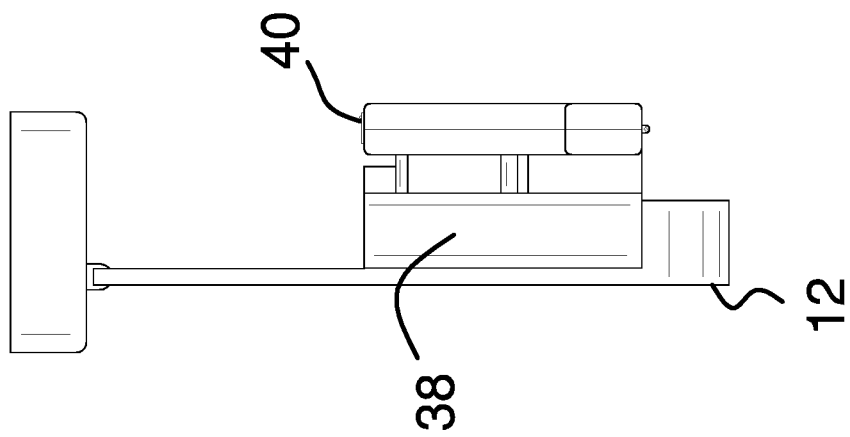
FIG. 4 is a left side view of an embodiment of the disclosure.
Figure 8:
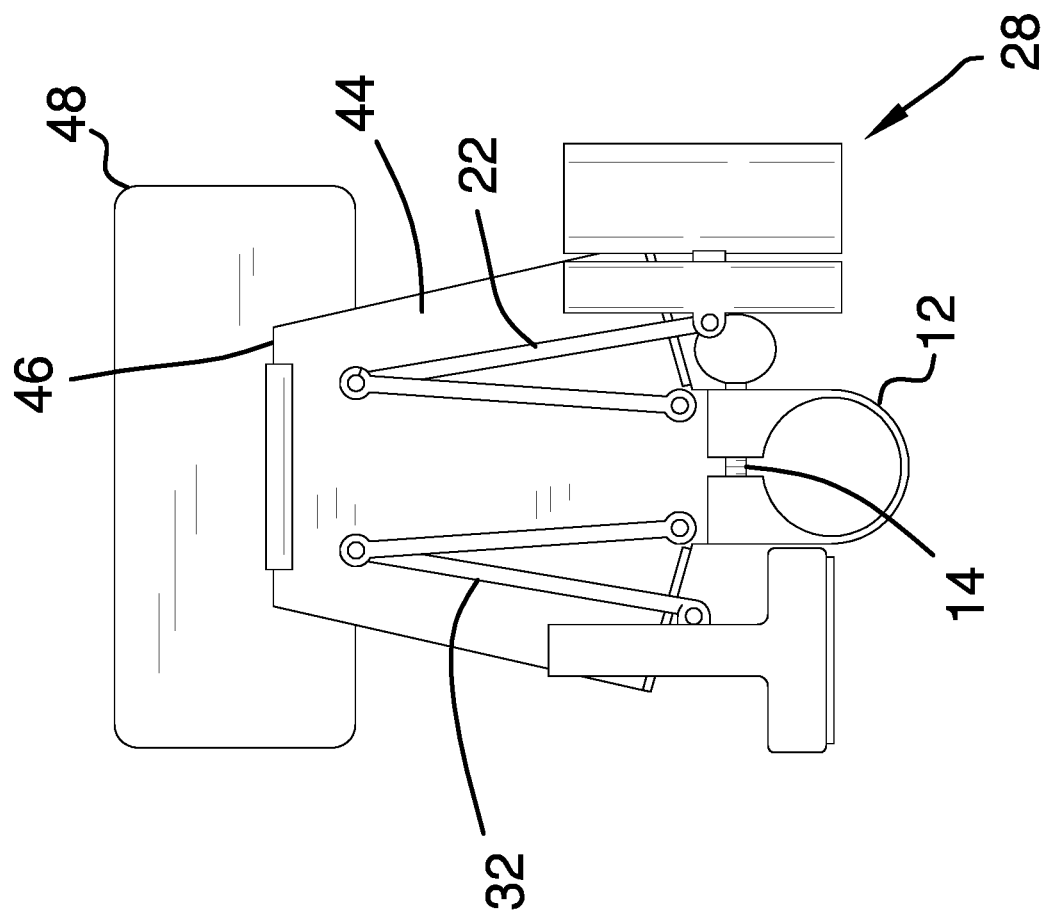
FIG. 8 is a front view of an embodiment of the disclosure.

A plate 44 is attached to and extends upwardly from the mount 12. The plate 44 has an upper edge 46. A housing 48 is attached to the upper edge 46 and has an open top side 50. Articles such as bar soap or other larger items may be placed in the housing 48. The housing 48 may have a rectangular shape. As can be seen in FIGS. 5 and 8, the housing 48 may be hingedly coupled to the plate 44 to allow the housing 48 to be tilted backwardly when not in use.

In use, the assembly 10 is attached to the faucet 16 and provides a plurality of areas for a person to place their toiletries so that they are easily accessible and visible. This may include, for example, combs, toothbrushes, toothpaste, soap, face cream, razors, hair brushes and the like. This will allow a person to easy find the item they need and reduce the chance of injury from cuts associated with finding razors or other sharp objects which might otherwise be stored in a drawer.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A toiletry holding assembly configured for being mountable on a faucet, said assembly comprising:
    a mount having an opening extending therethrough for receiving a faucet, a securing member being engaged with said mount and being configured to tighten said mount on said faucet;
    a first arm being attached to and extending laterally outwardly from said mount, said first arm having an outer end;
    a plurality of containers being attached to said outer end of said first arm, each of said containers having an open top end;
    a second arm being attached to and extending laterally away from said mount in an opposite direction relative to said first arm, said second arm having a distal end relative to said mount;
    a vessel being attached to said distal end of said arm and having an open upper end; and
    said first arm having a break therein and including a pair of sections hingedly coupled to each other such that said first arm is capable of being deployed or collapsed relative to said mount.

2. The toiletry holding assembly according to claim 1, wherein at least one of said containers has a cylindrical shape and at least one of said containers has an oblong shape.

3. The toiletry holding assembly according to claim 1, wherein said second arm has a break therein and including a pair of portions hingedly coupled to each other such that said second arm is capable of being deployed or collapsed relative to said mount.

4. The toiletry holding assembly according to claim 3, further including a case having a closable lid being attached to said distal end of said second arm.

5. The toiletry holding assembly according to claim 4, further including a plate being attached to and extending upwardly from said mount, said plate having an upper edge, a housing being attached to said upper edge and having an open top side.

6. The toiletry holding assembly according to claim 1, further including a case having a closable lid being attached to said distal end of said second arm.

7. A toiletry holding assembly configured for being mountable on a faucet, said assembly comprising:
    a mount having an opening extending therethrough for receiving a faucet, a securing member being engaged with said mount and being configured to tighten said mount on said faucet;

a first arm being attached to and extending laterally outwardly from said mount, said first arm having an outer end;

a plurality of containers being attached to said outer end of said first arm, each of said containers having an open top end;

a second arm being attached to and extending laterally away from said mount in an opposite direction relative to said first arm, said second arm having a distal end relative to said mount;

a vessel being attached to said distal end of said arm and having an open upper end; and a plate being attached to and extending upwardly from said mount, said plate having an upper edge, a housing being attached to said upper edge and having an open top side.

8. A toiletry holding assembly configured for being mountable on a faucet, said assembly comprising:

a mount having an opening extending therethrough for receiving a faucet, a securing member being engaged with said mount and being configured to tighten said mount on said faucet;

a first arm being attached to and extending laterally outwardly from said mount, said first arm having an outer end, said first arm having a break therein and including a pair of sections hingedly coupled to each other such that said first arm is capable of being deployed or collapsed relative to said mount;

a plurality of containers being attached to said outer end of said first arm, each of said containers having an open top end, at least one of said containers having a cylindrical shape, at least one of said containers having an oblong shape;

a second arm being attached to and extending laterally away from said mount in an opposite direction relative to said first arm, said second arm having a distal end relative to said mount, said second arm having a break therein and including a pair of portions hingedly coupled to each other such that said second arm is capable of being deployed or collapsed relative to said mount;

a vessel being attached to said distal end of said arm and having an open upper end;

a case having a closable lid being attached to said distal end of said second arm;

a plate being attached to and extending upwardly from said mount, said plate having an upper edge; and a housing being attached to said upper edge and having an open top side, said housing having a rectangular shape.

\* \* \* \* \*